United States Patent
Liao et al.

(10) Patent No.: US 11,902,414 B2
(45) Date of Patent: Feb. 13, 2024

(54) LOW-LATENCY PIPELINE AND METHOD FOR USE OF A LOW LATENCY PIPELINE IN HOMOMORPHIC ENCRYPTION

(71) Applicant: HUAWEI TECHNOLOGIES CO., LTD., Guangdong (CN)

(72) Inventors: Haohao Liao, Waterloo (CA); Zhiwei Shang, Waterloo (CA); Yin Tan, Waterloo (CA)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 272 days.

(21) Appl. No.: 17/566,783

(22) Filed: Dec. 31, 2021

(65) Prior Publication Data
US 2023/0216656 A1 Jul. 6, 2023

(51) Int. Cl.
*H04L 29/06* (2006.01)
*H04L 9/00* (2022.01)
*G06F 17/16* (2006.01)
*G06F 7/72* (2006.01)
*H04L 9/30* (2006.01)

(52) U.S. Cl.
CPC .............. *H04L 9/008* (2013.01); *G06F 7/728* (2013.01); *G06F 17/16* (2013.01); *H04L 9/3093* (2013.01)

(58) Field of Classification Search
None
See application file for complete search history.

(56) References Cited

U.S. PATENT DOCUMENTS

| | | | |
|---|---|---|---|
| 10,541,805 B2 * | 1/2020 | Laine | H04L 9/008 |
| 11,256,431 B1 * | 2/2022 | Ben-Yehuda | G06F 3/0608 |
| 2017/0024349 A1 * | 1/2017 | Yang | H03K 19/17728 |
| 2017/0155628 A1 * | 6/2017 | Rohloff | H04L 63/02 |
| 2018/0060038 A1 * | 3/2018 | Serrano | G06F 17/10 |
| 2018/0097632 A1 * | 4/2018 | Greiner | G06F 12/1408 |
| 2022/0229634 A1 * | 7/2022 | Hein | G06E 1/065 |

* cited by examiner

Primary Examiner — Maung T Lwin
(74) Attorney, Agent, or Firm — Locke Lord LLP; Tim Tingkang Xia, Esq.

(57) ABSTRACT

A low latency relinearization process can be performed in an FPGA cluster for accelerating homomorphic encryption. The low-latency process performs an early calculation of matrix rows to make the summation result available earlier in the relinearization to reduce waiting of subsequent operations.

20 Claims, 4 Drawing Sheets

US 11,902,414 B2

LOW-LATENCY PIPELINE AND METHOD FOR USE OF A LOW LATENCY PIPELINE IN HOMOMORPHIC ENCRYPTION

TECHNICAL FIELD

The current disclosure relates to accelerating homomorphic encryption and in particular to a low latency hardware pipeline for accelerating portions of the homomorphic encryption process.

BACKGROUND

Homomorphic Encryption (HE), or fully homomorphic encryption (FHE) allows arbitrary computation on encrypted data which enables privacy preserving computation. However, the large computation overhead leads to a significantly slow speed for the homomorphic encryption.

Homomorphic encryption can be accelerated using specific hardware implemented using a field programmable gate array (FPGA). A state of the art FPGA-based hardware accelerator is provided by HEAX (Homomorphic Encryption Acceleration). HEAX provides an implementation of the Cheon-Kim-Kim-Song (CKKS) relinearization operation on a single FPGA. The CKKS relinearization operation is used in homomorphic encryption.

While existing techniques have accelerated homomorphic encryption, the process remains relatively slow and would benefit from additional, alternative, and/or improved acceleration techniques.

SUMMARY

In accordance with the present disclosure there is provided a low-latency relinearization method implemented by a field programmable gate array (FPGA) cluster comprising: receiving at the FPGA cluster a polynomial vector comprising R components; and performing modular reduction on the polynomial vector to generate a polynomial matrix comprising R+1 rows and R columns. multiplying the polynomial matrix by a first Keyswitch matrix to generate a first intermediate polynomial matrix; summing a last row of the first intermediate polynomial matrix to generate a first early-summation element and performing a modular reduction on the first early-summation element to generate a first early-summation vector; summing remaining rows of the first intermediate polynomial matrix to generate a first summation vector; subtracting the first early-summation vector from the first summation vector to generate a first subtraction-result vector; multiplying the first subtraction-result vector by an inverse moduli vector to generate a first result vector; and outputting from the FPGA cluster the first result vector.

In a further embodiment of the method, multiplying the polynomial matrix by the first Keyswitch matrix to generate the first intermediate polynomial matrix is done to generate the last row of the first Keyswitch matrix first.

In a further embodiment of the method, the intermediate polynomial matrix is larger than available memory resources and is processed in slices of rows.

In a further embodiment of the method, the method further comprises: multiplying the polynomial matrix by a second Keyswitch matrix to generate a second intermediate polynomial matrix; summing a last row of the second intermediate polynomial matrix to generate a second early-summation element and performing a modular reduction on the second early-summation element to generate a second early-summation vector; summing remaining rows of the second intermediate polynomial matrix to generate a second summation vector; and subtracting the second early-summation vector from the second summation vector to generate a second subtraction-result vector; multiplying the second subtraction-result vector by an inverse moduli vector to generate a second result vector; and outputting from the FPGA cluster the second result vector.

In a further embodiment of the method, the received polynomial vector is in a number-theoretical transform (NTT) domain, the method further comprising: prior to performing modular reduction on the polynomial vector, transforming the NTT domain polynomial vector to the INTT domain; prior to multiplying the polynomial matrix by the first Keyswitch matrix, transforming the INTT domain polynomial matrix to the NTT domain; prior to performing the modular reduction on the first early-summation element, transforming the NTT domain first early-summation element to the INTT domain.

In a further embodiment of the method, the FPGA cluster comprises: a plurality of NTT modules for transforming a vector or matrix from the INTT domain to the NTT domain; a plurality of INTT modules for transforming a vector or matrix from the NTT domain to the INTT domain; and a plurality of multiplication modules for multiplying polynomial vectors in the NTT domain.

In a further embodiment of the method, the plurality of NTT modules, INTT modules and multiplication modules are arranged to provide a pipeline for performing the low-latency relinearization method.

In a further embodiment of the method, the pipeline is arranged in a plurality of stages comprising: a first stage for transforming the NTT domain polynomial vector to the INTT domain; a second stage for transforming the INTT the polynomial matrix to the NTT domain; a third stage for multiplying the polynomial matrix in the NTT domain by the first Keyswitch matrix; a fourth stage for transforming the first early-summation element and the summation vector from the NTT domain to the INTT domain; a fifth stage for transforming the first subtraction-result vector from the INTT domain to the NTT domain; and a sixth stage for multiplying the first subtraction-result vector in the NTT domain by the inverse moduli vector.

In a further embodiment of the method: the first stage further performs modular reduction on the INTT domain polynomial vector; the third stage performs the modular addition for each row vector; and the fifth stage performs the modular subtraction.

In a further embodiment of the method, the fourth stage further performs modular reduction on the INTT domain first early-summation element.

In accordance with the present disclosure there is further provided a field programmable gate array (FPGA) cluster for use in homomorphic encryption comprising: a plurality of FPGAs configured to provide a pipeline for providing a low-latency relinearization method comprising: receiving at the FPGA cluster a polynomial vector comprising R components; performing modular reduction on the polynomial vector to generate a polynomial matrix comprising R+1 rows and R columns; multiplying the polynomial matrix by a first Keyswitch matrix to generate a first intermediate polynomial matrix; summing a last row of the first intermediate polynomial matrix to generate a first early-summation element and performing a modular reduction on the first early-summation element to generate a first early-summation vector; summing remaining rows of the first intermediate polynomial matrix to generate a first summation vector; subtracting the first early-summation vector from the first summation vector to generate a first subtraction-result vector; multiplying the first subtraction-result vector by an inverse moduli vector to generate a first result vector; and outputting from the FPGA cluster the first result vector.

In a further embodiment of the FPGA cluster, the intermediate polynomial matrix is larger than available on chip memory and DSP resource and is processed in slices of rows.

In a further embodiment of the FPGA cluster, the received polynomial vector is in a number-theoretical transform (NTT) domain, the method further comprising: prior to performing modular reduction on the polynomial vector, transforming the NTT domain polynomial vector to the INTT domain; prior to multiplying the polynomial matrix by the first Keyswitch matrix, transforming the INTT domain polynomial matrix to the NTT domain; prior to performing the modular reduction on the first early-summation element, transforming the NTT domain first early-summation element to the INTT domain.

In a further embodiment of the FPGA cluster, the plurality of FPGAs provide: a plurality of NTT modules for transforming a vector or matrix from the INTT domain to the NTT domain; a plurality of INTT modules for transforming a vector or matrix from the NTT domain to the INTT domain; and a plurality of multiplication modules for multiplying polynomial vectors in the NTT domain, In a further embodiment of the FPGA cluster, the pipeline is arranged in a plurality of stages comprising: a first stage for transforming the NTT domain polynomial vector to the INTT domain; a second stage for transforming the INTT domain polynomial matrix to the NTT domain; a third stage for multiplying the polynomial matrix in the NTT domain by the first Keyswitch matrix; a fourth stage for transforming the first early-summation element from the NTT domain to the INTT domain; a fifth stage for transforming the first subtraction-result vector from the INTT domain to the NTT domain; and a sixth stage for multiplying the first subtraction-result vector in the NTT domain by the inverse moduli vector.

In a further embodiment of the FPGA cluster: the first stage further performs modular reduction on the INTT domain polynomial vector; the third stage performs the modular addition for each row vector; and the fifth stage performs the modular subtraction.

In a further embodiment of the FPGA cluster, the fourth stage further performs modular reduction on the INTT domain first early-summation element.

In a further embodiment of the FPGA cluster, multiplying the polynomial matrix by the first Keyswitch matrix to generate the first intermediate polynomial matrix is done to generate the last row of the first Keyswitch matrix first.

In a further embodiment of the FPGA cluster, the method provided by the pipeline further comprising: multiplying the polynomial matrix by a second Keyswitch matrix to generate a second intermediate polynomial matrix; summing a last row of the second intermediate polynomial matrix to generate a second early-summation element and performing a modular reduction on the second early-summation element to generate a second early-summation vector; summing remaining rows of the second intermediate polynomial matrix to generate a second summation vector; and subtracting the second early-summation vector from the second summation vector to generate a second subtraction-result vector; multiplying the second subtraction-result vector by an inverse moduli vector to generate a second result vector; and outputting from the FPGA cluster the second result vector.

In a further embodiment of the FPGA cluster, the received polynomial vector is in a number-theoretical transform (NTT) domain, the method further comprising: prior to performing modular reduction on the polynomial vector, transforming the NTT domain polynomial vector to the INTT domain; prior to multiplying the polynomial matrix by the first Keyswitch matrix, transforming the INTT domain polynomial matrix to the NTT domain; prior to performing the modular reduction on the first early-summation element, transforming the NTT domain first early-summation element to the INTT domain.

The latency of a relinearization process used in homomorphic encryption can be reduced using a slice-based approach that sums row elements of a matrix to generate a column vector instead of generating the summation by summing the columns of the matrix. Further, in order to allow subsequent steps of a pipeline to proceed without waiting, the low-latency process may generate the last element of the column vector first by summing the last row of the matrix. This element is used in determining each element of a result vector and as such, having it available first, reduces the latency for calculating the result vector(s) of the relinearization process.

BRIEF DESCRIPTION OF THE DRAWINGS

Further features and advantages of the present disclosure will become apparent from the following detailed description, taken in combination with the appended drawings, in which.

DETAILED DESCRIPTION

Figure 1:
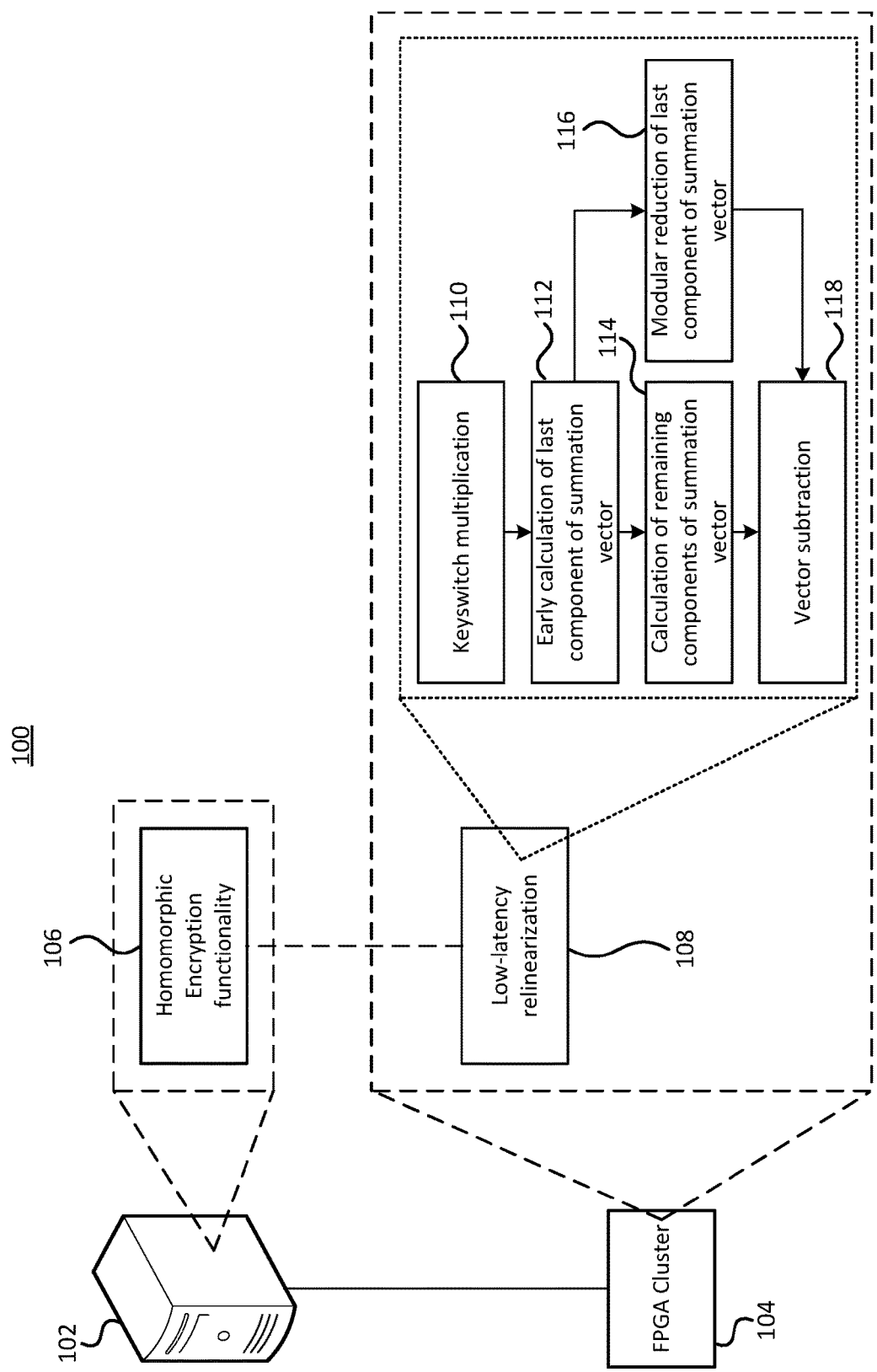
FIG. 1 depicts a system providing a low-latency pipeline for use in homomorphic encryption.

A homomorphic encryption pipeline may be used to provide the encryption process. The pipeline may be characterized by various performance characteristics, including for example throughput and latency. The throughput provides a measurement of how much data the pipeline can process in a given amount of time, whereas latency provides a measurement of how long it takes after providing an input for the output to be available from the pipeline. Both may be important characteristics and a trade-off between the two may be required for different applications. That is, in certain applications, a higher throughput may be desirable even at the cost of higher latency, while in other applications, a lower latency may be desirable even at the cost of lower throughput. The current process provides a lower latency process for the relinearization used in homomorphic encryption. The low-latency process performs an early sum calculation on a last row of a matrix in order to make the result available as remaining matrix rows are summed. The early sum calculation can significantly reduce the latency while only slightly reducing the throughput.

The homomorphic encryption process may make use of a relinearization process, which in turn comprises a Keyswitch process and a Residual Number System (RNS) Floor operation. The Keyswitch and RNS Floor algorithm works as follows. An input vector of ciphertext $C_i$ is received, where $i \in [0, R-1]$, each $C_i$ is a polynomial of degree $N-1$ and the coefficient bit width is $q_i$. R is the number of RNS components. Two Keyswitch keys are used to transform the ciphertext into constant term and the linear term. The structure of both keys are the same. Each key is represented as a matrix shown in Table 1, where $K_{i,j}$ is a polynomial and i,j represents the RNS component i and moduli $P_j$. $i \in [0, R-1]$ and $j \in [0, R]$

TABLE 1

The Keyswitch key structure

| K0, 0 | K1, 0 | ... | KR − 1, 0 |
|---|---|---|---|
| K1, 0 | K1, 1 | ... | K1, R − 1 |
| ... | ... | ... | ... |
| KR, 0 | KR, 1 | ... | KR, R − 1 |

Since the Keyswitch key is the same structure for both sets of key, only one is shown in Table 1 and in later explanation for the algorithm. The relinearization process outputs constant term and linear term ciphertext, $\text{Const}_i$ where $i \in [0, R-1]$, and $\text{Linear}_i$ where $i \in [0, R-1]$.

In calculating the constant and linear terms, the input ciphertext vector is expanded to a matrix by doing modular reduction on $P_j$, the resulting ciphertext matrix is depicted in Table 2.

TABLE 2 the ciphertext matrix structure

| C0, 0 | C1, 0 | ... | CR − 1, 0 |
|---|---|---|---|
| C1, 0 | C1, 1 | ... | C1, R − 1 |
| ... | ... | ... | ... |
| CR, 0 | CR, 1 | ... | CR, R − 1 |

The elements of the ciphertext matrix are updated by performing a pair-wise multiplication between the ciphertext matrix and the Keyswitch key matrix according to: $C_{i,j} = C_{i,j} \odot K_{i,j}$ mod $P_j$, where $\odot$ is the pair-wise multiplication of matrices. Modular addition is performed for each element in a row as $\text{Sum}_j = \Sigma_{i=0}^{R-1} C_{i,j}$. After the modular addition, a single column vector is generated as shown in Table 3

TABLE 3

Column vector for the result after modular addition for each row

| Sum0 |
| Sum1 |
| ... |
| SumR − 1 |
| SumR |

A modular reduction is performed on the last element of the column vector as $\text{Sum}_{R,j} = \text{Sum}_R$ mod $P_j$, $j \in [0, R-1]$. The output is calculated according to $\text{Const}_i = \text{Sum}_i - \text{Sum}_{R,i}$. As can be seen, $\text{Sum}_R$ must be available before determining any of the elements of the output vector. The current process performs the calculation early so that it is available before the other elements $\text{Sum}_m$ where $m \in [0, R-1]$.

FIG. 1 depicts a system providing a low-latency pipeline for use in homomorphic encryption. The system 100 comprises a computer device 102 and an FPGA cluster 104. The computer device 102 comprises at least one processor capable of executing instructions which may be stored in a memory. When the at least one processor execute the instructions, the computing device is configured to provide various functionality including homomorphic encryption functionality 106. It will be appreciated that only the functionality of the homomorphic encryption 106 is depicted in FIG. 1, however the computing device 102 will include additional functionality that can incorporate the homomorphic encryption into various different applications. While the computing device 102 provides homomorphic encryption functionality 106, the functionality makes use of the FPGA cluster 104 in order to accelerate portions of the homomorphic encryption process. As depicted, the FPGA cluster 104 may provide a hardware-based low-latency relinearization process for use by the homomorphic encryption functionality 106.

As part of the relinearization process, modular reduction is performed on a ciphertext vector of polynomials to generate a matrix of polynomials representing a ciphertext. The matrix of polynomials is multiplied by a pair of Keyswitch matrices to generate two intermediate matrices, which are processed in the same manner. The rows of the matrices are summed together to generate respective column vectors and a modular reduction is performed on the last element of each column vector, which is then subtracted from the remaining elements of the column vector. Broadly, this portion of the relinearization process comprises the Keyswitch operation followed by an RNS floor operation. The Keyswitch and RNS floor operations may be defined by:

Keyswitch:

$$c_{0,i,j} = \text{NTT}(\text{INTT}(c_{2,j}) \bmod p_i) \odot k_{0,i,j}, i,j \in [0,R-1]. \quad (1)$$

$$c_{0,i} \leftarrow \Sigma_{j=0}^{R-1} c_{0,i,j} \quad (2)$$

RNS Floor:

$$c_{0,i}' = \text{NTT}(\text{INTT}(c_{0,R}) \bmod p_i) \quad (3)$$

$$\text{out}_{0,i} = (c_{0,i} - c_{0,i}') \cdot (p_R^{-1})_{p_i} \quad (4)$$

Where:
NTT(•) represents a transformation from the Inverse Number Theoretic Transform (INTT) domain to the Number Theoretic Transform (NTT) domain;
INTT(•) represents a transformation from the NTT domain to the INTT domain;
mod $p_i$ represents the modular reduction using moduli $p_i$;
$c_{2,j}$ are the elements of and input vector $C_2$;
$c_{0,i,j}$ are the elements of a first one of the two intermediate matrices;
$k_{0,i,j}$ are the elements of a first one of the two Keyswitch matrices;
$c_{0,i}$ are the elements of a first one of two intermediate summation vectors;
$\text{out}_{0,i}$ are the elements of a first one of two output vectors; and
R is the number of RNS components of the input vector $C_2$.

The Keyswitch operation includes modular reduction, from vector of polynomials to matrix of polynomials, and modular multiplication, between the matrix of polynomials and the keyswitch key polynomials, and a row summation. The RNS floor operation includes a modular reduction on the last element of the column vector and a modular subtraction, followed by a modular multiplication As can be seen from equation (4), each element of the output vector requires element $c_{0,i}'$ to be available. From equation (3), the elements $c_{0,i}'$ are determined from element $c_{0,R}$, which is a vector generated from the last element of the summation column vector. The low-latency process first performs an early calculation of this element so that it is available as soon as the remaining elements are determined. As such, the overall latency of the relinearization process is reduced.

As depicted in FIG. 1, the low-latency relinearization process 108 performs a Keyswitch multiplication (110) and then performs an early calculation of the last component of the summation vector (112). That is, rather than generating the summation vector by summing rows in order, the early calculation process first determines the summation for the last row and then performs modular reduction on the sum of the last row (116). By performing this early calculation, the process can continue immediately once the other summations are determined instead of waiting for the result from the last row. Once the early calculation is performed, summation of the remaining rows, namely the first to the second last rows, is performed to compute the remaining components of the summation vector (114). As soon as the elements of the summation vector are available, elements of the output vector can be determined by subtracting (118) the appropriate element from the early calculation vector from the row summation result, and multiplying by $(p_R^{-1})_{pi}$.

Figure 2:
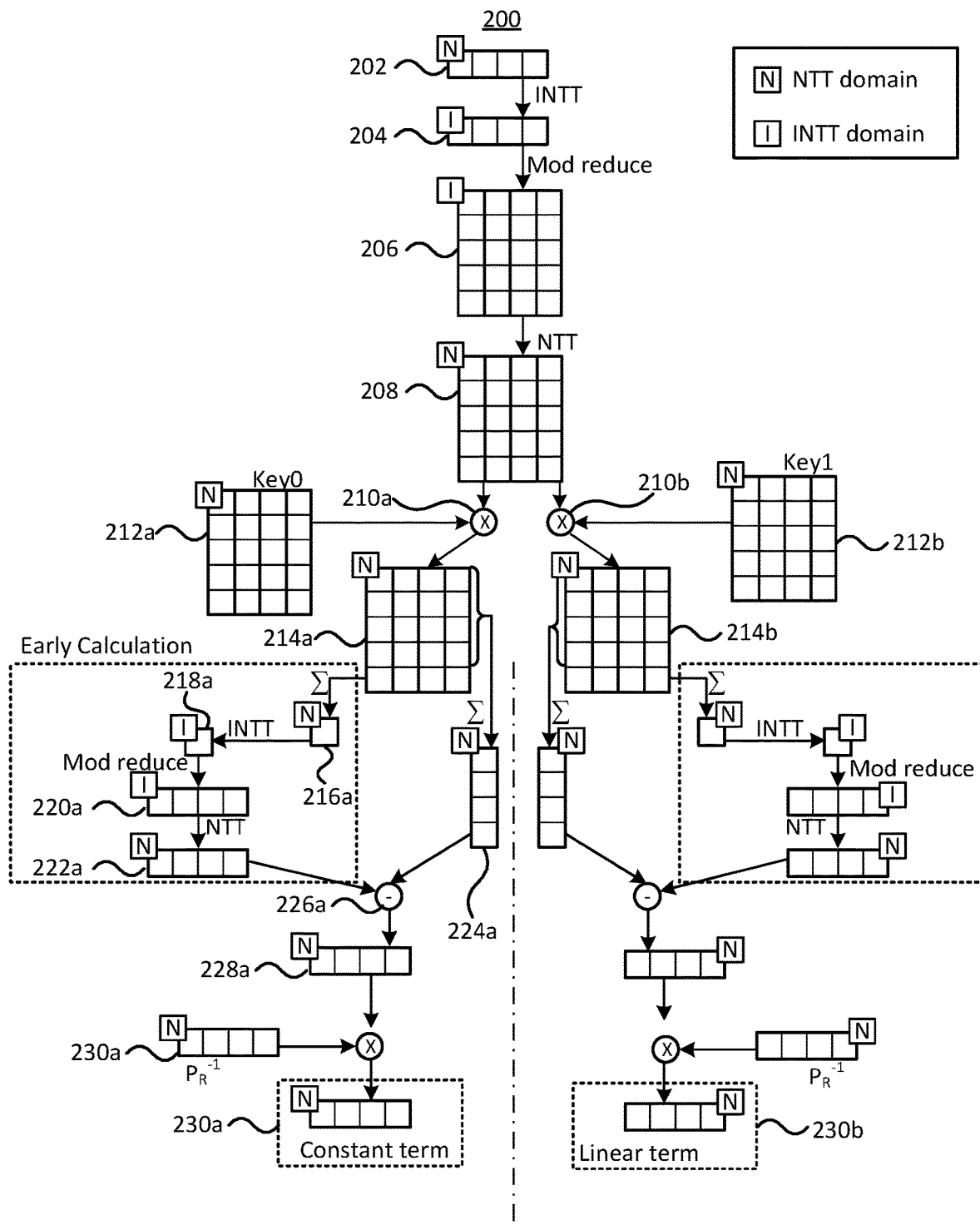
FIG. 2 depicts a low-latency process for use in homomorphic encryption.

FIG. 2 depicts a low-latency process for use in homomorphic encryption. The process 200 begins with receiving a polynomial vector 202 representing the ciphertext at the FPGA cluster. The polynomial vector is in the NTT domain and is transformed to the INTT domain 204. A modular reduction is performed on the polynomial vector to generate a polynomial matrix 206. The FPGA cluster processes the matrix 206 in parallel in order to transform the matrix from the INTT domain to the NTT domain 208. The Keyswitch is performed by multiplying 210a, 210b the matrix 208 by respective Keyswitch keys or matrices 212a, 212b. The multiplication generates two matrices 214a, 214b. The further processing is described with reference to only the first result matrix 214a, however the second result matrix 214b is processed in the same manner as depicted in FIG. 2. Processing of the first result matrix 214a generates a constant term of the output while processing the second result matrix 214b generates a linear term of the output.

The low-latency process performs an early calculation on the matrix 214a by summing the elements of the last row to generate a summation term 216a. The term is transformed to the INTT domain 218a and modular reduction performed to generate a vector 220a which is converted back to the NTT domain 222a. By performing the early calculation on the last row of the matrix, instead of waiting to sum the row elements in order, the vector 222a, which is necessary to calculate the output, is available as soon as the other row summations are available.

The remaining rows, namely the first to second last rows, are summed after the last row. The summation generates elements of a summation column vector 224a. Once summation element is determined, the subtraction 226a between the summation element and the vector from the last row summation can be performed and the result 228a multiplied by the inverse moduli 230 to provide the constant output term 230a. It will be appreciated that the processing may be performed in a pipeline so that processing can be begin on a second polynomial before processing is complete on a first polynomial. For example, a first polynomial vector may be input and as soon as the initial INTT is completed for the first input polynomial vector, a second input polynomial vector may be received and the INTT performed. While the second input polynomial vector is being processed by the INTT stage, the first input polynomial may be processed by the next pipeline stage, which may be the modular reduction and NTT transformation. Further, the above has described determining the constant term 230a vector from the intermediary matrix 214a resulting from the first Keyswitch key 212a. The same process is applied to the matrix 214b to generate the linear term vector 230b. The constant term and linear term vectors 230a, 230b are provided as the output from the low latency relinearization process.

Figure 3:
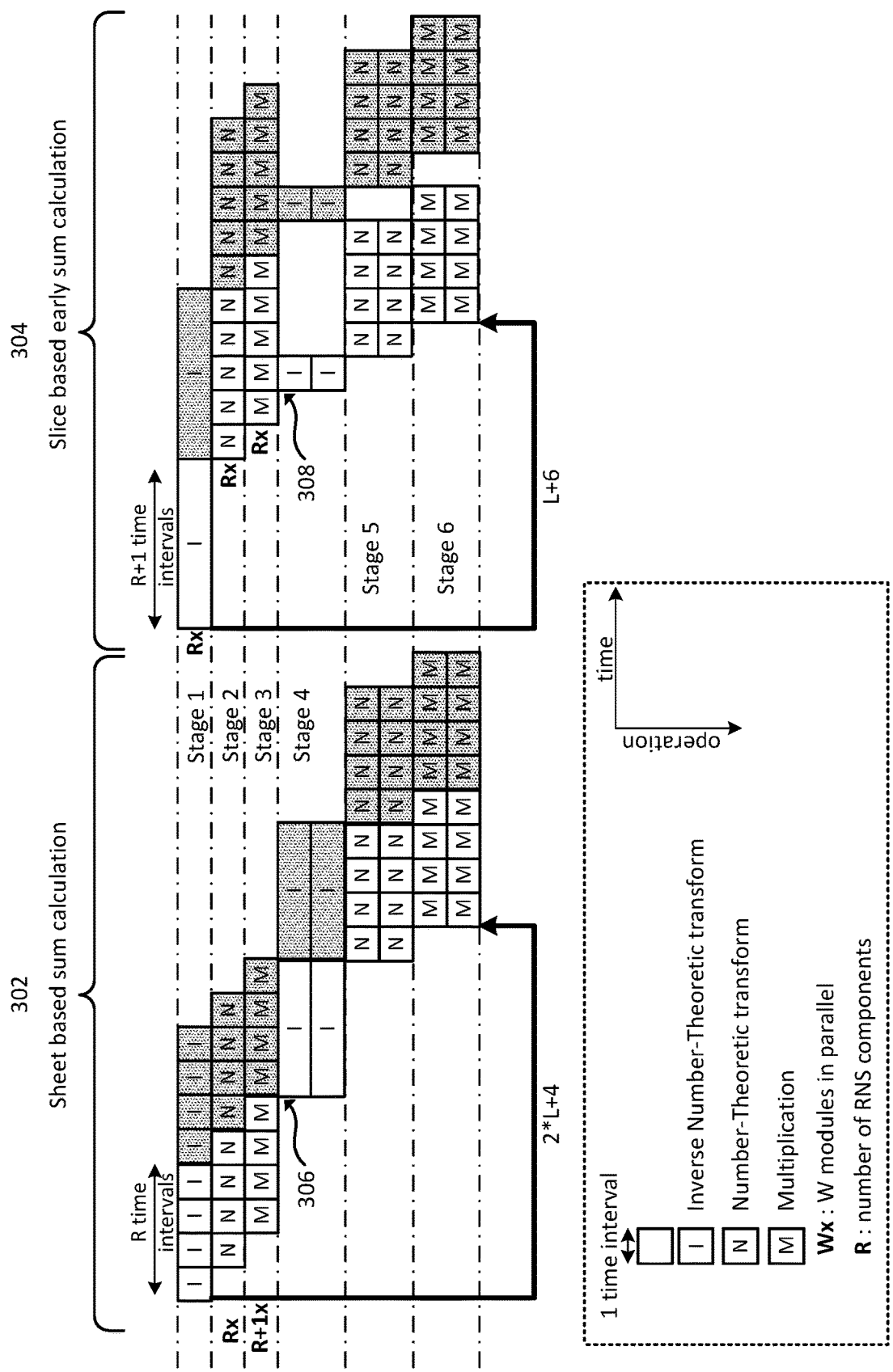
FIG. 3 depicts a comparison of operations between prior art process and a low-latency process.

FIG. 3 depicts a comparison of operations between prior art process and a low-latency process. The order of operations is depicted for a sheet-based ordered sum calculation as performed by the prior art and a slice-based early sum calculation as described above. It is not practical to process the whole matrix simultaneously inside the FPGA due to limited DSP and RAM resource. There are two approaches to process this matrix, referred to as sheet based and slice based. The slice-based calculation deals with a row vector at a time while the sheet-based calculation proceed a column vector for each iteration. The sheet-based ordered calculation calculates the summation vector as a summation of column vectors from the ciphertext matrix as opposed to the summation of the rows as provided by the current approach. Accordingly, it is not possible to perform the early calculation of the summation result for the last row of the matrix in the sheet based approach.

A difference between the two calculation processes is when the RNS-floor process could be started. In the sheet-based calculation, only after all sheets or columns of the matrix are processed can the RNS-floor be started. Additionally, for the sheet-based calculation, the subtraction between $c_{0,i} - c_{0,i}'$ has to wait until the INTT($c_{0,R}$) operation is completed. In contrast, slice-based calculation can avoid this waiting time by dealing with "slice R", or calculating the summation of the last row of the matrix, first, which enables the INTT($c_{0,R}$) operation to start while proceeding with the summation of other slices at the same time. While this approach reduces the latency, the number of polynomials inside each single slice is one less than that in each sheet, that is the number of columns in the matrix is one less than the number of rows. Hence, the throughput for the slice-based early calculation is slightly reduced.

The sheet-based ordered calculation and slice-based early calculation approaches lead to two different pipeline designs as depicted in FIG. 3, which depicts an illustrative hardware pipeline for R many RNS components. The modular reduction, subtraction, addition modules are not included in FIG. 3 since the pipeline implementation of these modules is straightforward and requires only a single pipeline stage. The length of each module represents the time it takes to finish the current process and is defined as one time interval.

In the sheet-based design, the INTT module in "Stage 1" transforms a single RNS component $c_{2,j}$ at a particular time interval. Hence, R time intervals are required to complete the operation. Following the INTT module is R many NTT modules are used at "Stage 2" since each sheet has R+1 polynomials, but only R many polynomials are transformed back to the time domain since NTT(INTT($c_{2,j}$) mod $p_i$)=$c_{2,j}$ when i==j. However, this optimization introduces data dependency and control logic complexity. Another R+1 many multiplication modules are deployed at "Stage 3" to perform the multiplication with the Keyswitch key with each multiplication module handling the multiplication with both Keyswitch keys. After completing all the sheets, the INTT module in "Stage 4" calculates the INTT($c_{0,R}$) and INTT ($c_{1,R}$). Another two NTT modules in "Stage 5" and multiplication modules in "Stage 6" completes the RNS-floor operation. The latency of this pipeline design is 2R+4 and the throughput is 1.

In the Slice-based design, L many INTT modules are required for "Stage 1" since the slice contains all the RNS components of the ciphertext. However, since the INTT operation over each RNS component only needs to be done once, the throughput of this INTT module is reduced to $1/(R+1)$ such that it matches the throughput of the NTT module in "Stage 2". R many NTT modules are used since each slice contains R many polynomials. The optimization provided by $NTT(INTT(c_{2,j}) \mod p_i) = c_{2,j}$ when $i = j$ was not used to avoid the data dependency and control logic complexity. The NTT modules take R+1 many time intervals since there are R+1 many slices. Once converted to the NTT, the ciphertext matrix and the Keyswitch matrices are multiplied by the "Stage 3" Multiplication modules. After the first slice is processed, the two INTT modules in "Stage 4" conduct $INTT(c_{0,L})$ and $INTT(c_{0,R})$ operations. The "Stage 5" and "Stage 6" are the same as described above. It can be found that during the remaining R time intervals, the INTT module is not processing any valid data until the next relinearization. The throughput of this design is slightly reduced to $R/(R+1)$; however the latency is significantly reduced to R+6.

Figure 4:
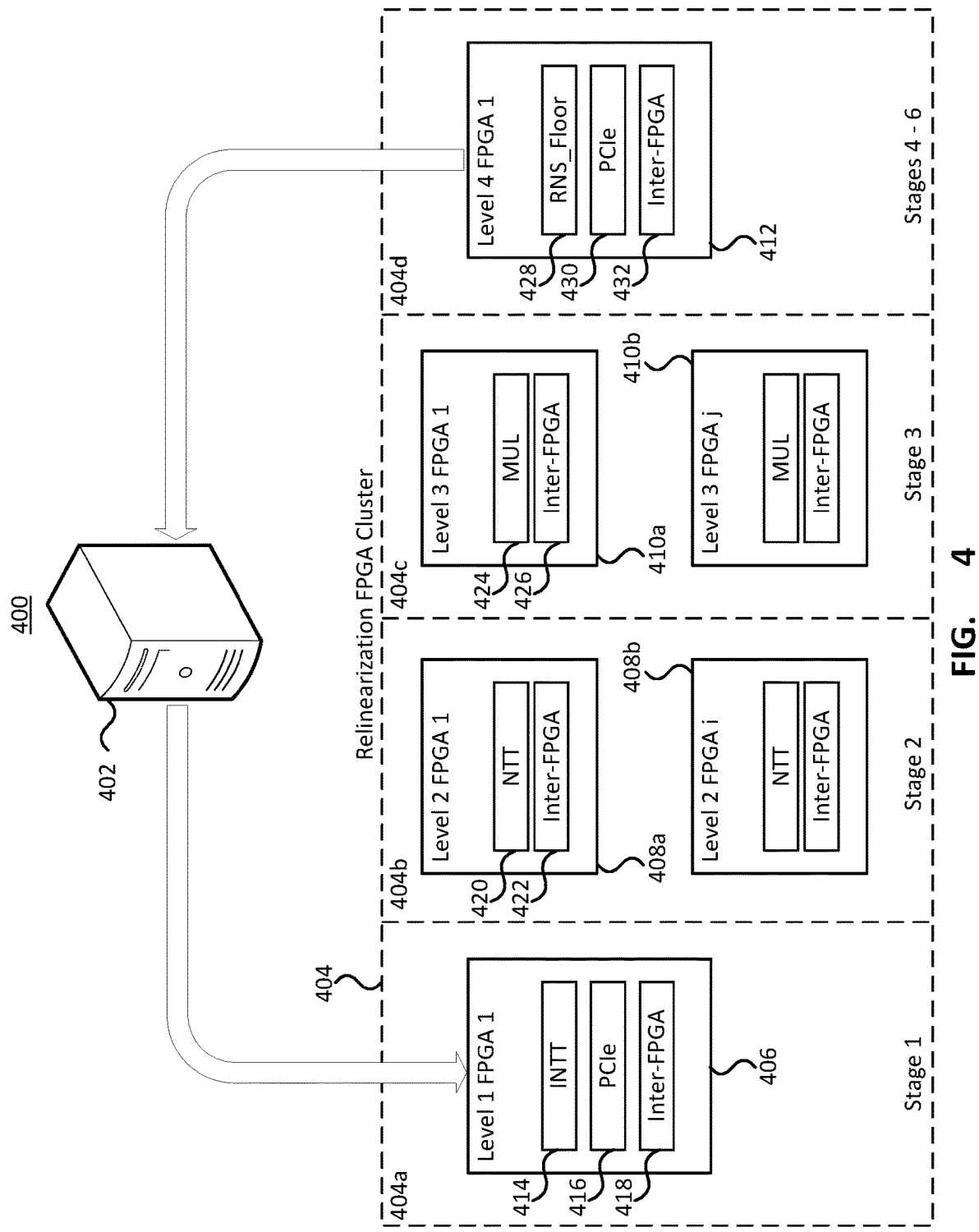
FIG. 4 depicts an FPGA cluster that may be used to implement the low-latency pipeline.

FIG. 4 depicts an FPGA cluster that may be used to implement the low-latency pipeline. The system 400 comprises a computing device 402 that is in communication, for example using a PCIe interface, with an FPGA cluster 404, which is used to accelerate the relinearization process for the computing device. The FPGA cluster 404 comprises a plurality of different levels 404a, 404b, 404c, 404d that are each responsible for different stages of the slice-based early calculation relinearization process described above. Each of the levels in the FPGA cluster comprise at least one FPGA device, while some of the levels, such as level 2 404b and level 3 404c each comprise a plurality of FPGA devices that operate in parallel. It will be appreciated that the example FPGA cluster in FIG. 4 is only an example and other implementations of FPGA clusters may be provided, such as an FPGA cluster that uses a single FPGA to perform the Keyswitch process and a second FPGA to perform the RNS Floor process.

The first level 404a of the FPGA cluster acts as an input layer that receives the ciphertext vector from the computing device 402. The first level of the FPGA cluster may be provided by a single FPGA device 406 that is configured to provide INTT functionality 408 of Stage 1 described with reference to FIG. 3. The INTT functionality can transform a polynomial from the NTT domain to the INTT domain. The INTT functionality of the first level FPGA may comprise one or more INTT modules, each with one or more INTT processing cores. For example, the INTT functionality may comprise R INTT modules each with a single core, where R is the number of RNS components of the input polynomial. The FPGA 406 further includes a communication interface, depicted as a PCIe interface, 410 for communicating with the computing device 402. In addition to the PCIe interface 410, the FPGA 406 also includes a high-speed inter-FPGA communication interface 412 for communicating with other FPGAs in the cluster, and in particular the FPGAs of the second level 404b. The inter-FPGA communication interface may be provided by, for example a protocol such as AURORA® (AURORA is a registered trademark of Xilinx Inc., San Jose, CA, USA) that uses 64b/66b encoding and can support communication speeds up to 1600 Gbps.

The second level 404b of the FPGA cluster comprises a plurality of FPGA devices 414a, 414b. Although only two FPGAs are depicted in FIG. 4, additional FPGAs may be included in the second level. Each of the FPGAs of the level 404b have substantially the same functionality and includes NTT functionality 416 of Stage 2 described with reference to FIG. 3. The NTT functionality transforms a polynomial from the INTT domain to the NTT domain. The NTT functionality provided by the plurality of level 2 FPGAs may comprise R, 2R, 3R or more NTT modules depending on the throughput requirement of the design and how many slices we want to proceed simultaneously, each comprising a plurality of NTT cores. Each of the FPGAs 414a, 414b also includes inter-FPGA interfaces 418 for communicating with other FPGAs. The FPGAs of each level do not need to communicate with FPGAs within the same level but rather, with FPGAs of the previous and subsequent levels.

The third level 404c of the cluster comprises a plurality of FPGA devices 420a, 420b. Although only two FPGAs are depicted in FIG. 4, additional FPGAs may be included in the third level. Each of the FPGAs of the level 404c have substantially the same functionality and includes multiplication functionality 422 for performing modular multiplication of Stage 3 described with reference to FIG. 3. The MUL functionality may comprise R, 2R or more MUL modules depending on the throughput requirement and the number of slices proceeded simultaneously, each with a plurality of MUL cores. Each of the FPGAs may further include inter-FPGA interfaces 424 for communicating with other FPGAs. The FPGAs of each level do not need to communicate with FPGAs within the same level but rather in FPGAs of the previous and subsequent levels.

The fourth level 404d of the cluster comprises a single FPGA device 426 although multiple FPGAs could be used. The FPGA 426 of the fourth level 404d may act as an output layer and communicates the relinearization result, namely the constant term and the linear term with the computing device 402. Although a single FPGA device is depicted, multiple FPGA devices could be provided in the fourth level 404d, for example one for computing the constant term, and one for computing the linear term. The FPGA device 426 comprise RNS Floor functionality 428 for performing the RNS floor operation performed by Stages 4-6 described with reference to FIG. 3. The RNS floor functionality may be provided using a plurality of INTT, NTT, and MUL modules. The FPGA device further comprises a communication interface 440 depicted as a PCIe interface for communicating with the computing device 402 as well as inter-FPGA communicating interface 442 for communicating with other FPGAs, and in particular the FPGAs of the previous level. It will be appreciated that the output bandwidth of the FPGA cluster should be twice that of the input bandwidth. While the input is a single vector of polynomials, the output is two vectors of polynomials namely the constant term polynomial and the linear term polynomial.

It will be appreciated that not all of the functionality provided by FPGA devices is depicted in FIG. 4. Only those processes that require significant computational resources are depicted. For example, one or more of the FPGAs may include modular reduction functionality, modular addition functionality, modular subtraction functionality etc. However, since these processes do not consume substantial resources they are omitted for clarity of the drawing.

It will be appreciated by one of ordinary skill in the art that the system and components shown in FIGS. 1 to 4 may include components not shown in the drawings. For simplicity and clarity of the illustration, elements in the figures are not necessarily to scale, are only schematic and are non-limiting of the elements structures. It will be apparent to persons skilled in the art that a number of variations and modifications can be made without departing from the scope of the present description.

Numerous additional variations on the methods and apparatus of the various embodiments described above will be apparent to those skilled in the art in view of the above description. Such variations are to be considered within the scope.

What is claimed is:

1. A low-latency relinearization method implemented by a field programmable gate array (FPGA) cluster comprising:
   receiving at the FPGA cluster a polynomial vector comprising R components; and
   performing modular reduction on the polynomial vector to generate a polynomial matrix comprising R+1 rows and L columns;
   multiplying the polynomial matrix by a first Keyswitch matrix to generate a first intermediate polynomial matrix;
   summing a last row of the first intermediate polynomial matrix to generate a first early-summation element and performing a modular reduction on the first early-summation element to generate a first early-summation vector;
   summing remaining rows of the first intermediate polynomial matrix to generate a first summation vector;
   subtracting the first early-summation vector from the first summation vector to generate a first subtraction-result vector;
   multiplying the first subtraction-result vector by an inverse moduli vector to generate a first result vector; and
   outputting from the FPGA cluster the first result vector.

2. The method of claim 1, wherein multiplying the polynomial matrix by the first Keyswitch matrix to generate the first intermediate polynomial matrix is done to generate the last row of the first Keyswitch matrix first.

3. The method of claim 1, wherein the intermediate polynomial matrix is larger than available memory resources and is processed in slices of rows.

4. The method of claim 1, further comprising:
   multiplying the polynomial matrix by a second Keyswitch matrix to generate a second intermediate polynomial matrix;
   summing a last row of the second intermediate polynomial matrix to generate a second early-summation element and performing a modular reduction on the second early-summation element to generate a second early-summation vector;
   summing remaining rows of the second intermediate polynomial matrix to generate a second summation vector; and
   subtracting the second early-summation vector from the second summation vector to generate a second subtraction-result vector;
   multiplying the second subtraction-result vector by an inverse moduli vector to generate a second result vector; and
   outputting from the FPGA cluster the second result vector.

5. The method of claim 1, wherein the received polynomial vector is in a number-theoretical transform (NTT) domain, the method further comprising:
   prior to performing modular reduction on the polynomial vector, transforming the NTT domain polynomial vector to the INTT domain;
   prior to multiplying the polynomial matrix by the first Keyswitch matrix, transforming the INTT domain polynomial matrix to the NTT domain;
   prior to performing the modular reduction on the first early-summation element, transforming the NTT domain first early-summation element to the INTT domain.

6. The method of claim 5, wherein the FPGA cluster comprises:
   a plurality of NTT modules for transforming a vector or matrix from the INTT domain to the NTT domain;
   a plurality of INTT modules for transforming a vector or matrix from the NTT domain to the INTT domain; and
   a plurality of multiplication modules for multiplying polynomial vectors in the NTT domain.

7. The method of claim 6, wherein the plurality of NTT modules, INTT modules and multiplication modules are arranged to provide a pipeline for performing the low-latency relinearization method.

8. The method of claim 7, wherein the pipeline is arranged in a plurality of stages comprising:
   a first stage for transforming the NTT domain polynomial vector to the INTT domain;
   a second stage for transforming the INTT the polynomial matrix to the NTT domain;
   a third stage for multiplying the polynomial matrix in the NTT domain by the first Keyswitch matrix;
   a fourth stage for transforming the first early-summation element and the summation vector from the NTT domain to the INTT domain;
   a fifth stage for transforming the first subtraction-result vector from the INTT domain to the NTT domain; and
   a sixth stage for multiplying the first subtraction-result vector in the NTT domain by the inverse moduli vector.

9. The method of claim 8, wherein:
   the first stage further performs modular reduction on the INTT domain polynomial vector;
   the third stage performs the modular addition for each row vector; and
   the fifth stage performs the modular subtraction.

10. The method of claim 9, wherein the fourth stage further performs modular reduction on the INTT domain first early-summation element.

11. A field programmable gate array (FPGA) cluster for use in homomorphic encryption comprising:
    a plurality of FPGAs to provide a configured to provide a pipeline for providing a low-latency relinearization method comprising:
      receiving at the FPGA cluster a polynomial vector comprising R components;
      performing modular reduction on the polynomial vector to generate a polynomial matrix comprising R+1 rows and R columns;
      multiplying the polynomial matrix by a first Keyswitch matrix to generate a first intermediate polynomial matrix;
      summing a last row of the first intermediate polynomial matrix to generate a first early-summation element and performing a modular reduction on the first early-summation element to generate a first early-summation vector;
      summing remaining rows of the first intermediate polynomial matrix to generate a first summation vector;
      subtracting the first early-summation vector from the first summation vector to generate a first subtraction-result vector;

multiplying the first subtraction-result vector by an inverse moduli vector to generate a first result vector; and outputting from the FPGA cluster the first result vector.

12. The FPGA cluster of claim 11, wherein the intermediate polynomial matrix is larger than available on chip memory and DSP resource and is processed in slices of rows.

13. The FPGA cluster of claim 11, wherein the received polynomial vector is in a number-theoretical transform (NTT) domain, the method further comprising:
prior to performing modular reduction on the polynomial vector, transforming the NTT domain polynomial vector to the INTT domain;
prior to multiplying the polynomial matrix by the first Keyswitch matrix, transforming the INTT domain polynomial matrix to the NTT domain;
prior to performing the modular reduction on the first early-summation element, transforming the NTT domain first early-summation element to the INTT domain.

14. The FPGA cluster of claim 13, wherein the pipeline is arranged in a plurality of stages comprising:
a first stage for transforming the NTT domain polynomial vector to the INTT domain;
a second stage for transforming the INTT domain polynomial matrix to the NTT domain;
a third stage for multiplying the polynomial matrix in the NTT domain by the first Keyswitch matrix;
a fourth stage for transforming the first early-summation element from the NTT domain to the INTT domain;
a fifth stage for transforming the first subtraction-result vector from the INTT domain to the NTT domain; and
a sixth stage for multiplying the first subtraction-result vector in the NTT domain by the inverse moduli vector.

15. The FPGA cluster of claim 14, wherein:
the first stage further performs modular reduction on the INTT domain polynomial vector;
the third stage performs the modular addition for each row vector; and
the fifth stage performs the modular subtraction.

16. The FPGA cluster of claim 15, wherein the fourth stage further performs modular reduction on the INTT domain first early-summation element.

17. The FPGA cluster of claim 11, wherein the plurality of FPGAs provide:
a plurality of NTT modules for transforming a vector or matrix from the INTT domain to the NTT domain;
a plurality of INTT modules for transforming a vector or matrix from the NTT domain to the INTT domain; and
a plurality of multiplication modules for multiplying polynomial vectors in the NTT domain.

18. The FPGA cluster of claim 11, wherein multiplying the polynomial matrix by the first Keyswitch matrix to generate the first intermediate polynomial matrix is done to generate the last row of the first Keyswitch matrix first.

19. The FPGA cluster of claim 11, wherein the method provided by the pipeline further comprise:
multiplying the polynomial matrix by a second Keyswitch matrix to generate a second intermediate polynomial matrix;
summing a last row of the second intermediate polynomial matrix to generate a second early-summation element and performing a modular reduction on the second early-summation element to generate a second early-summation vector;
summing remaining rows of the second intermediate polynomial matrix to generate a second summation vector; and
subtracting the second early-summation vector from the second summation vector to generate a second subtraction-result vector;
multiplying the second subtraction-result vector by an inverse moduli vector to generate a second result vector; and
outputting from the FPGA cluster the second result vector.

20. The FPGA cluster of claim 11, wherein the received polynomial vector is in a number-theoretical transform (NTT) domain, the method further comprising:
prior to performing modular reduction on the polynomial vector, transforming the NTT domain polynomial vector to the INTT domain;
prior to multiplying the polynomial matrix by the first Keyswitch matrix, transforming the INTT domain polynomial matrix to the NTT domain;
prior to performing the modular reduction on the first early-summation element, transforming the NTT domain first early-summation element to the INTT domain.

* * * * *